(12) United States Patent
Ye

(10) Patent No.: US 10,017,955 B2
(45) Date of Patent: Jul. 10, 2018

(54) MOBILE BASE HAVING TELESCOPIC FOOT PEDAL

(71) Applicant: Yong He, Taizhou, Zhejiang Province (CN)

(72) Inventor: Lianghui Ye, Taizhou (CN)

(73) Assignee: Yong He (CN)

( * ) Notice: Subject to any disclaimer, the term of this patent is extended or adjusted under 35 U.S.C. 154(b) by 0 days.

(21) Appl. No.: 15/160,026

(22) Filed: May 20, 2016

(65) Prior Publication Data

US 2017/0114563 A1   Apr. 27, 2017

(30) Foreign Application Priority Data

Oct. 22, 2015 (CN) .................... 2015 2 0818740 U

(51) Int. Cl.
| | |
|---|---|
| *F16M 13/00* | (2006.01) |
| *E04H 12/22* | (2006.01) |
| *B62B 3/02* | (2006.01) |
| *A45B 11/00* | (2006.01) |
| *A45B 23/00* | (2006.01) |

(52) U.S. Cl.
CPC .......... *E04H 12/2238* (2013.01); *A45B 11/00* (2013.01); *A45B 23/00* (2013.01); *B62B 3/02* (2013.01); *F16M 13/00* (2013.01); *A45B 2023/0006* (2013.01); *A45B 2023/0012* (2013.01); *A45B 2023/0081* (2013.01)

(58) Field of Classification Search
USPC ....................................................... 248/519
See application file for complete search history.

(56) References Cited

U.S. PATENT DOCUMENTS

| | | | | |
|---|---|---|---|---|
| 6,367,494 B1* | 4/2002 | Tung | .................... | E04H 12/2238 135/44 |
| 7,641,165 B2* | 1/2010 | Li | ........................ | E04H 12/2238 135/16 |
| 8,632,045 B2* | 1/2014 | Ma | ......................... | A45B 23/00 135/16 |
| 8,657,246 B2* | 2/2014 | Ma | ..................... | E04H 12/2238 248/129 |
| 8,919,361 B2* | 12/2014 | Ma | ..................... | E04H 12/2238 135/16 |
| 9,192,266 B2* | 11/2015 | Starr | ...................... | F16M 11/42 |
| 2002/0185582 A1* | 12/2002 | Li | ......................... | A45B 23/00 248/522 |

(Continued)

*Primary Examiner* — Monica E Millner
(74) *Attorney, Agent, or Firm* — PROI Intellectual Property US

(57) ABSTRACT

Disclosed is a mobile base having a telescopic foot pedal. The mobile base comprises a base frame, a counterweight block, and a base cover; wherein the base frame is cooperatively provided with a lifting primary arm, one end of the lifting primary arm rotatably mating with a guiding rod, a lower end of the guiding rod mating with a track locking member fixed on the base frame, the other end of the lifting primary arm rotatably mating with a U-shaped support on the base frame, an end portion on the lifting primary arm proximate the guiding rod is cooperatively provided with a telescopic foot pedal, the other end of the lifting primary arm being connected to a group of lifting secondary arms, the lifting secondary arms respectively rotatably mating with the base frame, bottoms of the lifting secondary arms being fixedly provided with universal wheels.

4 Claims, 4 Drawing Sheets

(56) References Cited

U.S. PATENT DOCUMENTS

| | | | |
|---|---|---|---|
| 2005/0189005 A1* | 9/2005 | Smith | G09F 23/00 135/16 |
| 2009/0174162 A1* | 7/2009 | Gass | B25H 1/04 280/79.11 |
| 2012/0285499 A1* | 11/2012 | Li | E04H 12/2246 135/16 |

* cited by examiner

MOBILE BASE HAVING TELESCOPIC FOOT PEDAL

TECHNICAL FIELD

The present invention relates to the technical field of sunshade umbrella accessories, and in particular, relates to a mobile base having telescopic foot pedal.

BACKGROUND

At present, the base of a sunshade umbrella is integral and fixed, which is fixedly connected to the upper umbrella rod and the umbrella surface. As such, while moving, the sunshade umbrella needs to be moved as a whole. Since the sunshade umbrella has a large size and is heavy, movement of the sunshade umbrella is laboring and inconvenient.

SUMMARY

To address the problem in the related art, the present invention is intended to provide a mobile base having telescopic foot pedal.

The mobile base having a telescopic foot pedal comprises a base frame, a counterweight block, and a base cover; wherein the base frame is cooperatively provided with a lifting primary arm, one end of the lifting primary arm rotatably mating with a guiding rod, a lower end of the guiding rod mating with a track locking member fixed on the base frame, the other end of the lifting primary arm rotatably mating with a U-shaped support on the base frame, an end portion on the lifting primary arm proximate the guiding rod is cooperatively provided with a telescopic foot pedal, the other end of the lifting primary arm being connected to a group of lifting secondary arms, the lifting secondary arms respectively rotatably mating with the base frame, bottoms of the lifting secondary arms being fixedly provided with universal wheels.

In the mobile base having a telescopic foot pedal, a tension spring B is arranged between an upper portion of the guiding rod and the lifting primary arm.

In the mobile base having a telescopic foot pedal, the track locking member comprises a retaining ring, a cyclic step-like surface arranged in the retaining ring, and a track mating bump arranged within the cyclic step-like surface, wherein the track mating bump is formed by a downwardly inclined portion, a hook-shaped portion, and an upwardly inclined portion.

In the mobile base having a telescopic foot pedal, the base frame is provided with a group of lifting secondary arm supports, the lifting secondary arm supports being inclined upwardly and towards a center of the frame base, each of the lifting secondary arm supports being rotatably connected to the lifting secondary arms via an arranged pin shaft D.

In the mobile base having a telescopic foot pedal, the lifting secondary arms are hinged to a cross-like joint, the cross-like joint being connected to the lifting primary arm via an arranged hexagon socket head cap screw.

In the mobile base having a telescopic foot pedal, a connection point between the lifting secondary arm supports and the lifting secondary arms is lower than a connection point between the lifting primary arm and the U-shaped support.

In the mobile base having a telescopic foot pedal, a tension spring A is arranged between the cross-like joint and the lifting primary arm.

The mobile base having a telescopic foot pedal features compact structure and reasonable design. By arranging a lifting primary arm in the base frame, and by controlling the lifting primary arm, the guiding rod moves in the track locking member, such that the lifting secondary arms drive the universal wheels thereon to move upward and downward. In this way, the sunshade umbrella is capable of quickly and conveniently moving when the universal wheels are in contact with the ground, and the operations are simple, convenient and labor-saving.

REFERENCE NUMERALS AND DENOTATIONS THEREOF

Figure 1:
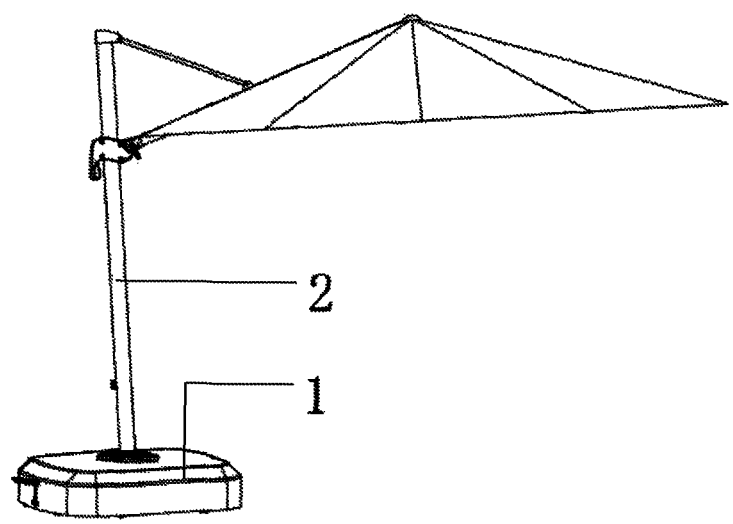
FIG. 1 is a schematic view illustrating use status of a mobile base having a telescopic foot pedal according to the present invention.
Figure 2:
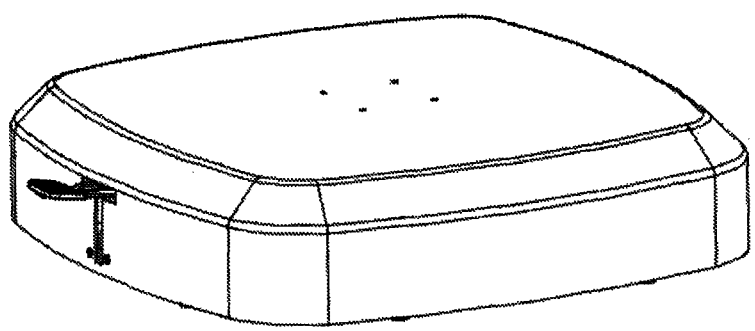
FIG. 2 is a schematic view illustrating an appearance of a mobile base having a telescopic foot pedal according to the present invention.
Figure 3:
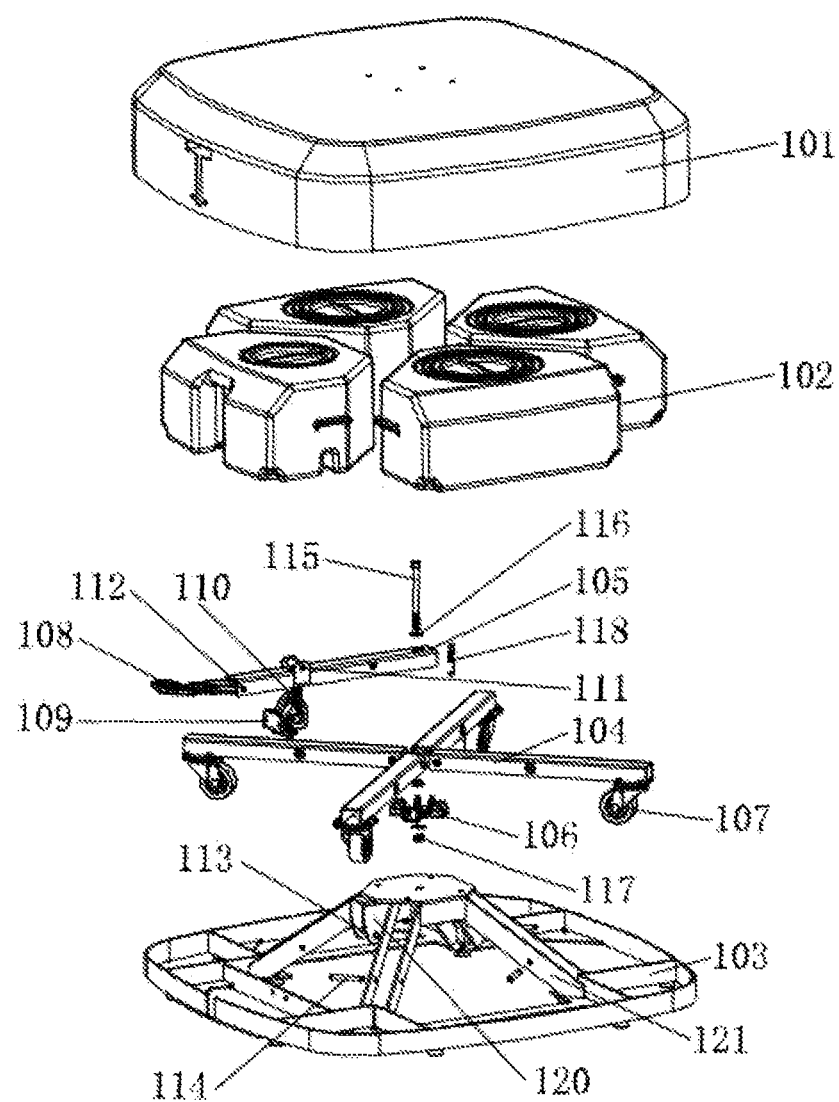
FIG. 3 is a schematic exploded view of a mobile base having a telescopic foot pedal according to the present invention.
Figure 4:
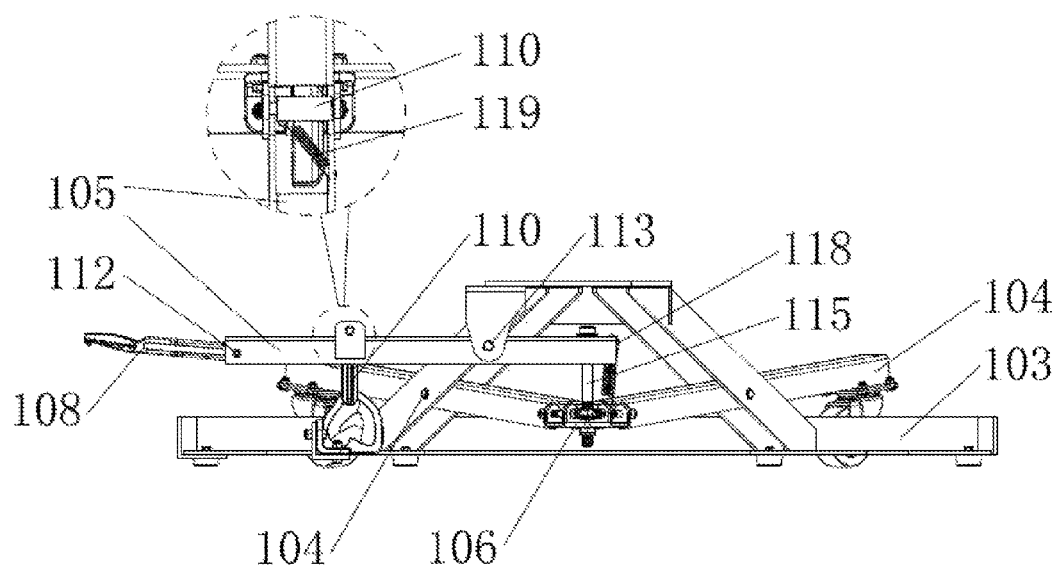
FIG. 4 is a schematic inner structural view of a mobile base having a telescopic foot pedal according to the present invention.

1—mobile base, 2—sunshade umbrella, 101—base cover, 102—counterweight block, 103—base frame, 104—lifting secondary arm, 105—lifting primary arm, 106—cross-like joint, 107—universal wheel, 108—telescopic foot pedal, 109—track locking member, 110—guiding rod, 111—pin shaft A, 112—pin shaft B, 113—pin shaft C, 114—pin shaft D, 115—hexagon socket head cap screw; 116—pad, 117—nut, 118—tension spring A, 119—tension spring B, 120—U-shaped support, 121—lifting secondary arm support, 122—retaining ring, 123—cyclic step-like surface, 124—track mating bump, 125—first step-like surface, 126—second step-like surface, 127—third step-like surface.

DETAILED DESCRIPTION

The present invention is further described with reference to the drawings of the specification.

As illustrated in FIGS. 1 to 4, a mobile base having a telescopic foot pedal comprises a base frame 103, a counterweight block 102, and a base cover 101. The base frame 103 is cooperatively provided with a lifting primary arm 105.

One end of a lifting primary arm 105 mates with a guiding rod 110; and structurally preferably, a pair of lifting ears are arranged on the lifting primary arm 105, wherein the lifting ears rotatably mate with the guiding rod 110 via an arranged pin shaft A111. A lower end of the guiding rod 110 mates with a track locking member 109 fixed to the base frame 103. The mating portion between the lower end of the guiding rod 110 and the track locking member 109 may be a columnar structure, wherein the columnar structure is capable of abutting against the track locking member 109. A tension spring B119 is arranged between an upper portion of the guiding rod 110 and the lifting primary arm 105, wherein the tension spring B119 is arranged such that in one aspect the guiding rod constantly rotates in one direction and in another aspect the guiding rod 110 is prevented from moving outward. The track locking member 109 comprises a retaining ring 122, a cyclic step-like surface 123 arranged in the retaining ring 122, and a track mating bump 124 arranged within the cyclic step-like surface 123. The mating bump 124 is formed by means of enclosure of a downwardly inclined portion, a hook-shaped portion, and an upwardly inclined portion. The track mating bump 124 is arranged such that the guiding rod 110 moves along the surface thereof. The cyclic step-like surface 123 comprises a first step-like surface 125, a second step-like surface 126, and a third step-like surface 127. The cyclic step-like surface 123 is arranged such that the guiding rod 110 is only capable of rotating in one direction and is incapable of moving backward.

The other end of the lifting primary arm 105 rotatably mates with a U-shaped support 120 on the base frame 103; and structurally preferably, the lifting primary arm 105 is hinged to the U-shaped support 120 via an arranged pin shaft C113.

An end portion on the lifting primary arm 105 proximate the guiding rod 110 is cooperatively provided with a telescopic foot pedal 108; and structurally preferably, one end of the telescopic foot pedal 108 stretches into the guiding rod 110 and is connected thereto via an arranged pin shaft B112.

A group of lifting secondary arms 104 are connected to one end on the lifting primary arm 105, opposite to the telescopic foot pedal 108. The lifting secondary arms 104 are rotatably arranged in the base frame 103. Structurally preferably, the base frame 103 is provided with a group of lifting secondary arm supports 121, wherein the lifting secondary arm supports 121 are inclined upwardly and towards a center of the frame base 103, and each of the lifting secondary arm supports 121 is rotatably connected to the lifting secondary arms 104 via an arranged pin shaft D114. One end of each of the lifting secondary arms 104 is hinged to a cross-like joint 106. The cross-like joint 106 is located at a center of the base frame 103, and the cross-like joint 106 is connected to the lifting primary arm 105 via an arranged hexagon socket head cap screw 115, a pad 116, and a nut 117. To ensure that the lifting secondary arms 104 are capable of resetting, a tension spring A118 is arranged between the cross-like joint 106 and the lifting primary arm 105.

To ensure that the lifting secondary arms 104 are capable of being elevated by the lifting primary arm 105, a connection point between the lifting secondary arms 104 and the lifting arm supports 121 is lower than a connection point between the lifting primary arm 105 and the U-shaped support 120.

Each of the lifting secondary arms 104 is provided with universal wheels 107.

During mounting, the sunshade umbrella 2 is mounted on the mobile base 1.

Figure 5:
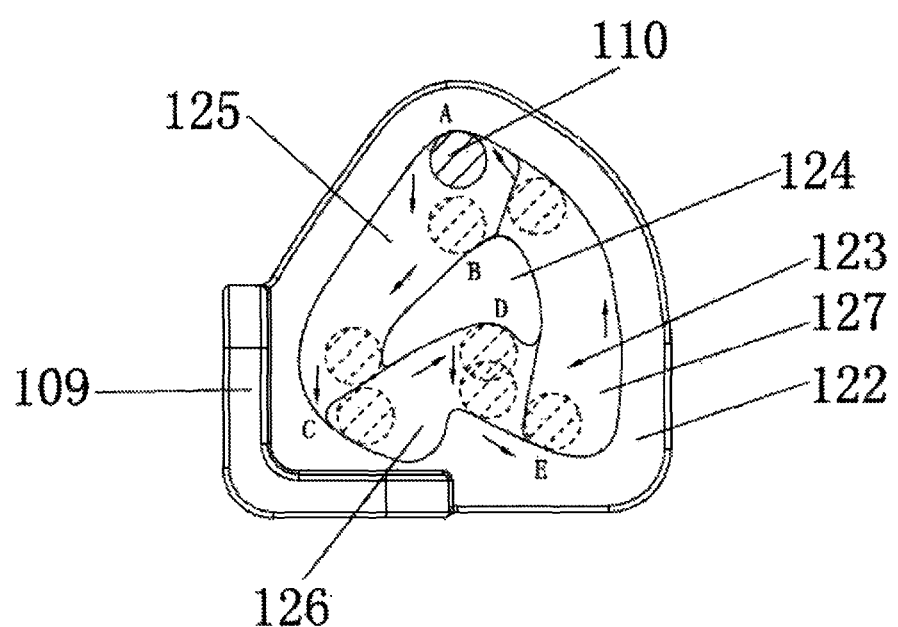
FIG. 5 is a schematic view illustrating working principles of a mobile base having a telescopic foot pedal according to the present invention.

As illustrated in FIG. 5, during operation, when the telescopic foot pedal 108 is stepped, the telescopic foot pedal 108 moves downward, and the lower end of the guiding rod 110 moves from point A to point B, and point B slides downward along a downwardly inclined portion of the track mating bump 124. Under the effect of the tension spring B119, the guiding rod 110 falls at the position of point C. When stepping is released from the telescopic foot pedal 108, under the effect of gravity, the lower end of the guiding rod 110 enters a hook-shaped portion of the track mating bump 124, that is, slides from point C to point D (the highest point in this section) and is hooked. When the telescopic foot pedal 108 is continuously stepped, the lower end of the guiding rod 110 moves downward from point D, and under the effect of the tension spring B119, falls at the position of point E. When stepping is released from the telescopic foot pedal 108, the lower end of the guiding rod 110 enters the upwardly inclined portion of the track mating bump 124, that is, slides from point E to point A (the highest point in this section) and is locked. The foot pedal returns to the original point, and through twice stepping on the foot pedal, a cyclic operation is completed.

Meanwhile, the lifting primary arm 105 rotates around the U-shaped support 120 on the base frame 103 and the pivot of a pin shaft C113. When the telescopic foot pedal 108 is stepped, the foot pedal moves downward, and due to rotation, the end point (close to the center of the base) is elevated. The height of the cross-like joint 106 is increased via the hexagon socket head cap screw 115. The elevation of the cross-like joint 106 directly drives the four lifting secondary arms 104 and the universal wheels 107 to rotate around the base frame 103 and the pivot of the pin shaft D114. The universal wheels 107 and the lifting secondary arms 104 (the end provided with a universal wheel) rotates downward, thereby elevating the base frame 103, counterweight block 102, the base cover 101 and the sunshade umbrella 2. The universal wheels 107 are in contact with the ground, which leaves no foundation between the base frame 103 and the ground, and achieves movement of the base on the ground. Likewise, when stepping is released from the telescopic foot pedal 108, the wheels of the universal wheels 107 suffer from no load, and thus the base frame 103 is in contact with the ground. As such, the base is incapable of moving.

What is claimed is:

1. A mobile base having a telescopic foot pedal, comprising a base frame, a counterweight block, and a base cover; wherein the base frame is cooperatively provided with a lifting primary arm having two ends, a first end of the lifting primary arm rotatably mating with a guiding rod, a lower end of the guiding rod mating with a track locking member fixed on the base frame, a second end of the lifting primary arm rotatably mating with a U-shaped support on the base frame; wherein said first end of the lifting primary arm is cooperatively provided with the telescopic foot pedal, said second end of the lifting primary arm is connected to a group of lifting secondary arms, said group of lifting secondary arms respectively rotatably mating with the base frame, bottoms of the lifting secondary arms being fixedly provided with universal wheels;

wherein the track locking member comprises a retaining ring, a cyclic step-like surface arranged in the retaining ring, and a track mating bump arranged within the cyclic step-like surface, wherein the track mating bump is formed by a downwardly inclined portion, a hook-shaped portion, and an upwardly inclined portion.

2. The mobile base having a telescopic foot pedal according to claim 1, wherein a tension spring B is arranged between an upper portion of the guiding rod and the lifting primary arm.

3. The mobile base having a telescopic foot pedal according to claim 1, wherein the lifting secondary arms are hinged to a cross-like joint, the cross-like joint being connected to the lifting primary arm via an arranged hexagon socket head cap screw.

4. The mobile base having a telescopic foot pedal according to claim 3, wherein a tension spring A is arranged between the cross-like joint and the lifting primary arm.

\* \* \* \* \*